July 10, 1928.                    N. WATERMAN                    1,676,468
                                  PLANT SUPPORT
                                Filed May 13, 1927
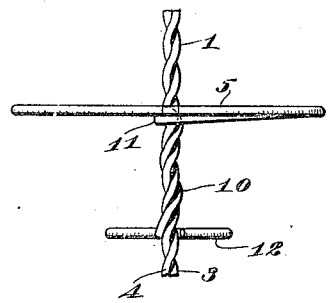
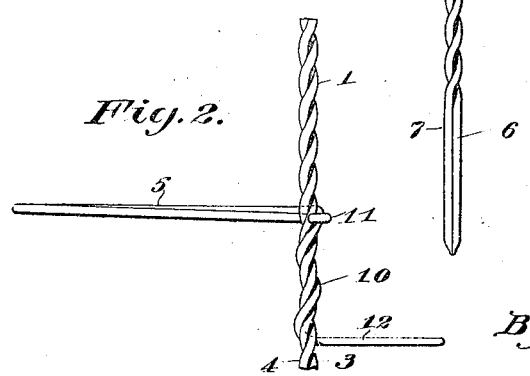

Patented July 10, 1928.

1,676,468

UNITED STATES PATENT OFFICE.

NIXON WATERMAN, OF CANTON, MASSACHUSETTS.

PLANT SUPPORT.

Application filed May 13, 1927. Serial No 191,218.

This invention relates to improvements in plant-supports, suitable alike for flower and vegetable plants.

One of the objects of the invention is to provide a simple, durable, compact and efficient device, formed entirely of wire and provided with a laterally extending plant-holder adapted to inclose the stalks or branches of a plant and movably attached to a spiral standard, on which the plant-holder may be readily revolved, adjusted and held at any desired elevation, thereby permitting a growing plants to be properly supported during the various stages of their growth.

Another object is to provide the plant-holder with means for fastening its free end so that the plant stalks or branches as well as the flowers or vegetables will be strongly supported and retained in position.

A further object is to provide the plant-holder with a main loop for inclosing the stalks or branches of a plant and an auxiliary loop, the latter of which by adding extra weight in simple form to the plant-holder is adapted to cause it to automatically revolve by its own weight upon the standard held in a vertical or substantially vertical position, when free of the plant, thereby providing means for automatically effecting ready adjustment of the plant-holder to the desired elevation.

Another object is to provide a standard having a spiral guideway formed of two strands of a single piece of wire twisted around each other, the standard being strong though relatively light in weight so as to provide ample support through the medium of the plant-holder to a plant inclosed therein, and provided with means to permit the standard to be easily inserted and held in the ground.

In order that the nature of my invention may be readily understood, I have illustrated certain embodiments of the invention in the accompanying drawings, in which—

Figure 1 is a perspective view of my improved plant-support, showing the device in operative position, with the hook end of the plant inclosing loop of the plant-holder fastened to the standard.

Figure 1 is a front elevation of the plant-holder detached from the standard and showing the main or plant inclosing loop, the auxiliary loop and the spiral connecting portion.

Figure 3 is a fragmentary view showing a portion of the standard and the same parts as are shown in Fig. 2.

In the drawings 1 designates a standard adapted to be held in a vertical position in the ground and consisting preferably of a single piece of strong, weatherproof galvanized wire bent at its center point to form a loop 2 and two downwardly extending members 3 and 4, which are twisted around each other so as to form a spiral guideway, on which are revolvably mounted one or more plant-holders 5. The lower ends 6 and 7 of the spiral forming members 3 and 4 are extended in parallel relation to each other and welded together, thus securely joining the members 3 and 4 in a unitary structure and forming the lower end of the standard 1 that may be easily inserted in the ground adjacent to the plant being supported, without disturbing the roots and that will permit the standard 1 to be held firmly in an upright position. In some cases, especially when large sizes of plant-supports are used, it may be desirable to form the end of the standard 1 differently, such as spacing apart the lower ends 6 and 7 to form a fork, which will aid in maintaining a large standard 1 in its proper, upright position.

The plant-holder 5 consists of a single piece of very flexible wire, which is bent to form a main or plant inclosing loop 8 and an auxiliary loop 9, extending laterally from the standard 1. The plant inclosing loop 8 is sufficiently large to be passed around and inclose the stalks or branches of a plant, so as to give ample support thereto. The auxiliary loop which may also be used, if necessary, to inclose some of the plant stalks or branches and is preferably smaller than the main loop 8, is adapted to add extra weight to the holder 5 so as to cause it to revolve readily by its own weight on the standard 1, when the standard 1 is held free of the plant, thereby effecting automatic and easy adjustment of the holder 5. The loops 8 and 9 are disposed in parallel planes and are joined to a spiral connecting portion 10, which is of the same spiral contour as the spiral guideway of the standard 1. When mounted in operative position on the standard 1 the spiral connecting portion 10 is adapted to fit into and coincide with the spirals of the spiral guideway of the standard 1, as the holder 5 with the loops 8 and 9 is revolved around the standard 1 and is thus adjusted to the position desired. The free end of the main loop 8 is bent to form a hook 11, which is adapted to be hooked about the standard 1 and fastened thereto, as shown in Fig. 1, after the main loop 8 has been passed around the stalks or branches of the plant, which will thereby be strongly supported and retained in position by the main loop 8. The free end 12 of the auxiliary loop 9 is preferably not hooked, but it may be hooked, if desired, while the auxiliary loop 9 itself may be as large as the main loop 8. While only one holder 5 is shown upon the standard 1, a number of holders 5 may be conveniently used upon the same standard.

The advantages and use of my invention will be readily understood from the foregoing description, when taken in conjunction with the accompanying drawings. In use the lower end of the standard 1 with one or more plant-holders 5 mounted thereon is inserted in the ground adjacent to the plant and placed in a vertical position, as shown in Fig. 1, after which the main loop 8, previously adjusted to the desired elevation and position to support the plant properly, may be readily passed around the plant and the hook 11 fastened to the standard 1. The ready adjustment of the holder 5 is an important feature of the invention and is quickly effected, after estimating its desired elevation, by simply permitting the holder 5 to rotate by its own weight under the influence of gravity around the spiral guideway of the standard 1 until the main loop 8 has reached the desired position. Thus the adjustment of the holder 5 is done automatically and is very easily effected. The fastening of the hook 11 of the main loop 8 to the standard 1 is not always necessary, especially when the main loop 8 is used to support light plants, since sufficient support will then be given by merely passing the main loop 8 around the plant. As the plant grows the position of the holder 5 may be adjusted accordingly, which adjustment is easily effected by tilting either the plant or the standard 1 to the desired position, then restoring the standard 1 to its vertical position and passing the main loop 8 around the plant and fastening the hook 11 to the standard 1 as previously described.

It is evident, therefore, that the invention provides a simple, strong and durable structure, which is well adapted for supporting plants.

It is, further, to be understood that various changes in the proportions and minor details of construction may be made without departing from the scope of the invention or sacrificing any of its advantages.

I claim:—

1. In a plant-support, the combination of a standard provided with spiral guiding means, and a plant-holder comprising a plant inclosing loop, spiral means adapted to fit into and coincide with the said spiral guiding means of the standard, and auxiliary means whereby under the influence of gravity automatic adjustment of the plant-holder may be effected.

2. In a plant-support, the combination of a standard formed of a single piece of wire bent at its center so as to provide two downwardly extending members twisted around each other and forming thereby a spiral guideway and a plant-holder co-operating therewith formed of a single piece of wire, mounted on the said standard and bent to form a main loop, an auxiliary loop, and a spiral connecting portion joining the said main and auxiliary loops thereto, the said main and auxiliary loops being disposed in parallel planes, and the said spiral connecting portion being adapted to coincide with the spirals of the spiral guideway of the standard and to be revolved upon the standard for adjustment of the plant-holder.

3. In a plant-support, the combination of a standard formed of a single piece of wire bent at its center so as to provide two downwardly extending members twisted around each other and forming thereby a spiral guideway, and a plant-holder formed of a single piece of wire mounted on the said standard and bent to form a main loop, a hook on the free end of the said main loop, an auxiliary loop, and a spiral connecting portion disposed vertically between the said main and auxiliary loops and joined thereto, the said main and auxiliary loops being disposed in parallel planes, and the said spiral connecting portion being adapted to coincide with and to follow the spirals of the spiral guideway of the standard as the said plant-holder is revolved upon the standard during its adjustment.

NIXON WATERMAN.